(12) United States Patent
Müller et al.

(10) Patent No.: US 9,199,554 B2
(45) Date of Patent: *Dec. 1, 2015

(54) LOCKING MECHANISM FOR A VEHICLE SEAT

(75) Inventors: Peter Müller, Mackenbach (DE); Olaf Kreuels, Zweibrücken (DE); Stefan Haber, Primasens (DE); Volker Windecker, Sippersfeld (DE); Denise Schmitt, Sippersfeld (DE)

(73) Assignee: KEIPER GMBH & CO. KG, Kaiserslautern (DE)

( * ) Notice: Subject to any disclaimer, the term of this patent is extended or adjusted under 35 U.S.C. 154(b) by 266 days.

This patent is subject to a terminal disclaimer.

(21) Appl. No.: 12/922,509

(22) PCT Filed: Jul. 2, 2009

(86) PCT No.: PCT/EP2009/004774
§ 371 (c)(1),
(2), (4) Date: Sep. 14, 2010

(87) PCT Pub. No.: WO2010/003587
PCT Pub. Date: Jan. 14, 2010

(65) Prior Publication Data
US 2011/0012415 A1    Jan. 20, 2011

(30) Foreign Application Priority Data
Jul. 11, 2008  (DE) .......................... 10 2008 033 304

(51) Int. Cl.
*E05C 3/16*  (2006.01)
*B60N 2/015*  (2006.01)
(Continued)

(52) U.S. Cl.
CPC ............ *B60N 2/01583* (2013.01); *B60N 2/366* (2013.01); *B60N 2205/20* (2013.01)

(58) Field of Classification Search
USPC .................. 297/336, 378.11, 378.12, 378.13; 296/65.03, 65.16, 65.17, 68.1; 292/341.12, 341.13, 341.14, DIG. 8, 292/DIG. 19, DIG. 30, DIG. 31, DIG. 56, 292/DIG. 57, 216, DIG. 65, DIG. 25, 217, 292/226, 198, 200, DIG. 23, DIG. 22, 336.3; 70/432
See application file for complete search history.

(56) References Cited

U.S. PATENT DOCUMENTS 3,848,911 A * 11/1974 Watermann et al. .......... 292/216
4,073,519 A    2/1978 Kurozu et al.
(Continued)

FOREIGN PATENT DOCUMENTS

DE         101 26 687      1/2002
DE         102004021516    11/2005
(Continued)

OTHER PUBLICATIONS

Certified Translation of DE 102008033304.2, faxed to the examiner by applicant's representative on Jul. 17, 2015.*
(Continued)

*Primary Examiner* — Alyson M Merlino
(74) *Attorney, Agent, or Firm* — McGlew and Tuttle, P.C.

(57) ABSTRACT

A locking mechanism (1) for a vehicle seat includes a latch (11) that is to be interlocked with an opposite element (B) and is mounted to be pivotable about a first bearing bolt (13), at least one securing element (25, 31) that secures the latch (11) in the locked state, and a movable unlocking handle (42). The unlocking handle (42) is directly hinged to one of the securing elements (25, 31) by means of a single pivot point (48).

20 Claims, 3 Drawing Sheets

(51) Int. Cl.
   *B60N 2/36* (2006.01)
   *B60N 2/02* (2006.01)

(56) References Cited

U.S. PATENT DOCUMENTS

| | | | | |
|---|---|---|---|---|
| 4,130,308 A * | 12/1978 | Jeavons | ......................... | 292/216 |
| 4,165,112 A * | 8/1979 | Kleefeldt | ...................... | 292/216 |
| 4,358,141 A * | 11/1982 | Hamada | ......................... | 292/216 |
| 4,711,493 A | 12/1987 | Schrom et al. | | |
| 4,941,696 A * | 7/1990 | Yamada et al. | ............... | 292/340 |
| 5,622,369 A * | 4/1997 | Rogers | ........................... | 273/398 |
| 5,642,636 A * | 7/1997 | Mitsui | ............................. | 70/237 |
| 5,727,825 A * | 3/1998 | Spurr | ...................... | 292/341.12 |
| 5,730,480 A * | 3/1998 | Takamura | .................. | 248/503.1 |
| 6,705,679 B1 * | 3/2004 | Zelmanov et al. | ....... | 297/378.13 |
| 6,733,078 B1 * | 5/2004 | Zelmanov | .................. | 297/378.1 |
| 6,820,912 B1 * | 11/2004 | Lavoie | ....................... | 296/65.03 |
| 6,902,237 B2 * | 6/2005 | Petry | ....................... | 297/344.15 |
| 7,152,926 B2 * | 12/2006 | Wrobel | .................... | 297/378.13 |
| 7,188,906 B2 * | 3/2007 | Christoffel et al. | ....... | 297/378.13 |
| 7,226,129 B2 * | 6/2007 | Brandes et al. | .......... | 297/378.13 |
| 7,306,269 B2 * | 12/2007 | Cetnar et al. | ............. | 292/341.12 |
| 7,404,605 B2 * | 7/2008 | Inoue et al. | ............... | 297/378.13 |
| 7,410,217 B2 * | 8/2008 | Inoue et al. | ............... | 297/378.13 |
| 7,416,254 B2 * | 8/2008 | Jennings | .................. | 297/378.12 |
| 7,494,187 B2 * | 2/2009 | Inoue et al. | ............... | 297/378.13 |
| 7,575,280 B2 * | 8/2009 | Palomba et al. | .............. | 297/336 |
| 7,762,605 B2 * | 7/2010 | Otsuka et al. | .............. | 296/65.03 |
| 7,845,692 B2 * | 12/2010 | Inan et al. | ...................... | 292/216 |
| 7,926,858 B2 * | 4/2011 | Otsuka | .......................... | 292/216 |
| 7,959,205 B2 * | 6/2011 | Paing et al. | ................ | 296/65.03 |
| 2005/0077770 A1 | 4/2005 | Lang et al. | | |
| 2005/0212338 A1 * | 9/2005 | Muller et al. | ................. | 297/336 |
| 2007/0057555 A1 * | 3/2007 | Woods et al. | ................. | 297/336 |
| 2007/0152484 A1 * | 7/2007 | Palomba et al. | .............. | 297/336 |
| 2008/0054151 A1 * | 3/2008 | Shimura et al. | ........... | 248/503.1 |
| 2009/0026790 A1 * | 1/2009 | O'Connor et al. | ......... | 296/65.03 |
| 2010/0052394 A1 * | 3/2010 | Heeg et al. | ................ | 297/378.13 |
| 2010/0102614 A1 * | 4/2010 | Kreuels et al. | ............ | 297/378.13 |
| 2011/0006576 A1 * | 1/2011 | Muller et al. | ............. | 297/378.13 |
| 2011/0006577 A1 * | 1/2011 | Muller et al. | ............. | 297/378.13 |

FOREIGN PATENT DOCUMENTS

| | | |
|---|---|---|
| EP | 0 894 926 | 2/1999 |
| EP | 0 952 288 A1 | 10/1999 |
| FR | 2 539 793 | 7/1984 |
| GB | 2 048 365 | 12/1980 |
| JP | 01 145840 | 10/1989 |
| JP | 07-018964 | 4/1995 |
| JP | 2005-132316 A | 5/2005 |
| JP | 60 114035 | 4/2014 |

OTHER PUBLICATIONS

Korean Office Action of Apr. 29, 2015.

* cited by examiner

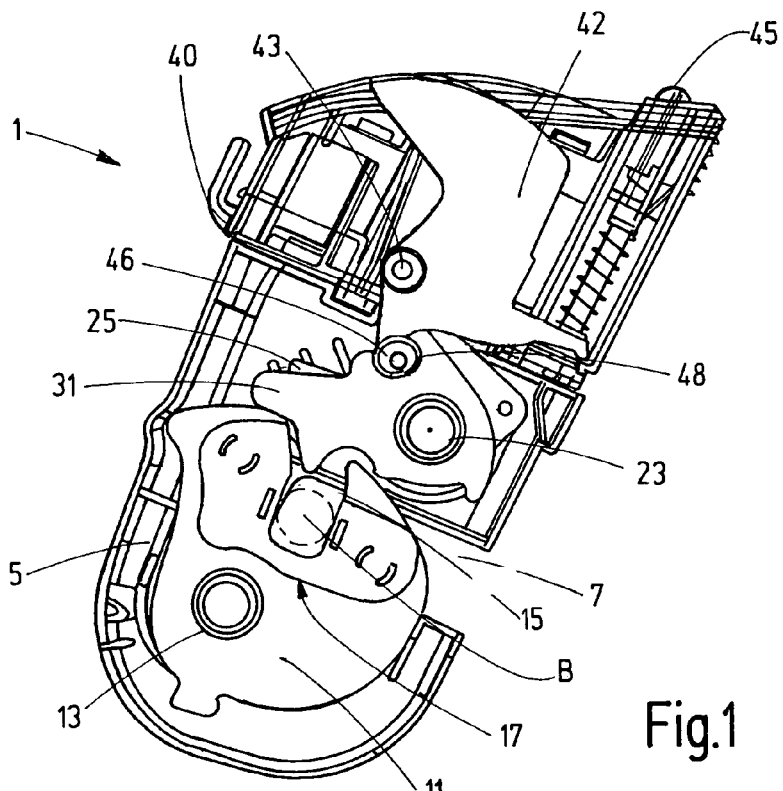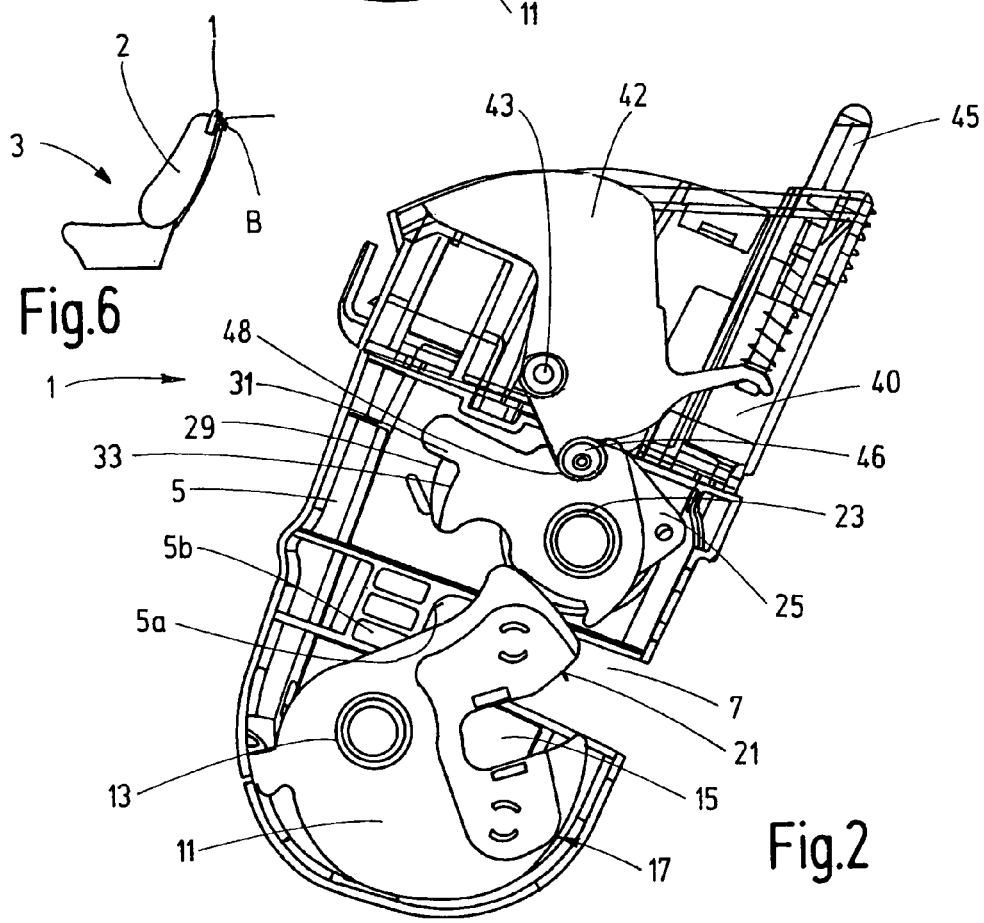

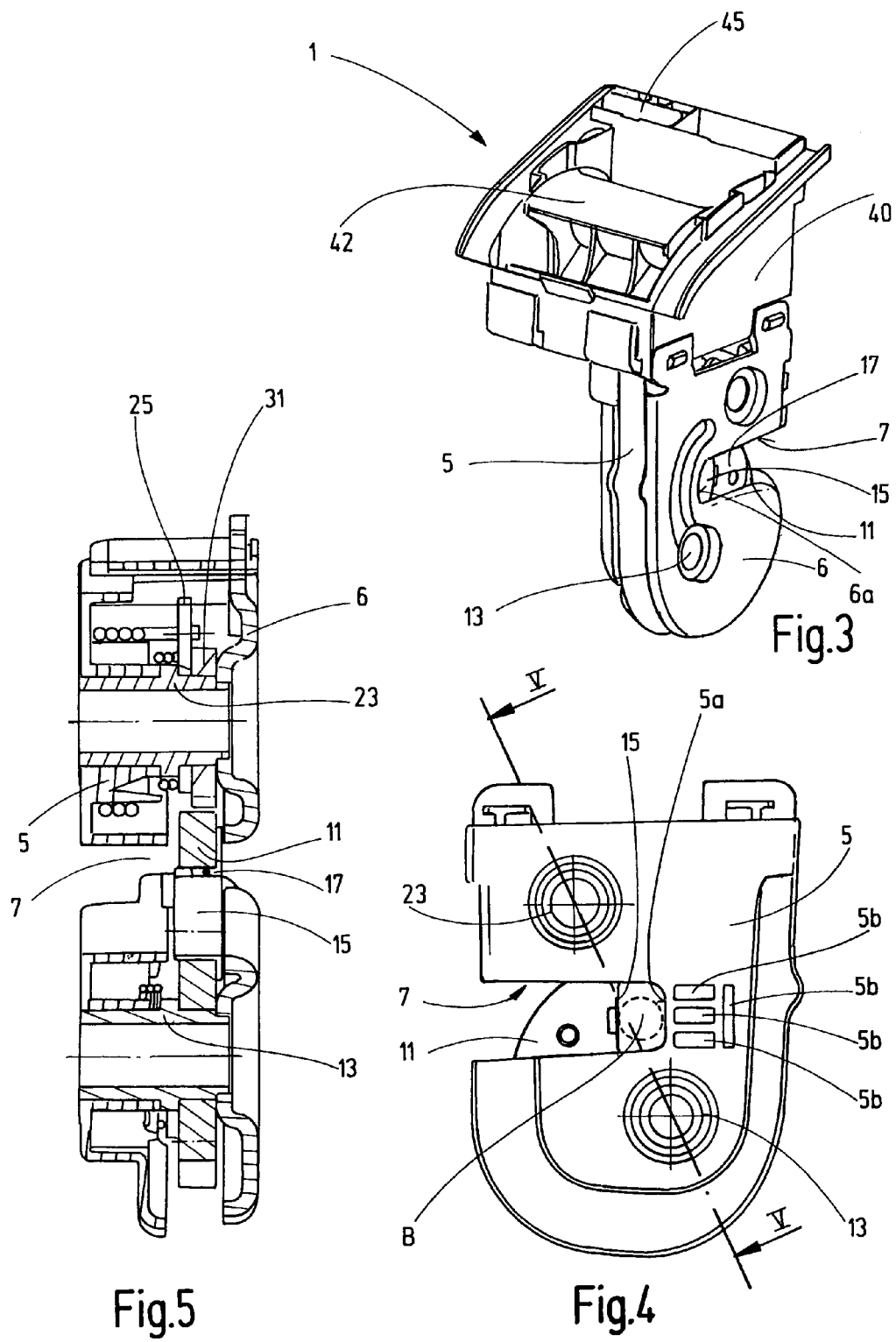

LOCKING MECHANISM FOR A VEHICLE SEAT

CROSS REFERENCE TO RELATED APPLICATIONS

This application is a United States National Phase application of International Application PCT/EP2009/004774 and claims the benefit of priority under 35 U.S.C. §119 of German Patent Application DE 10 2008 033 304.2 filed Jul. 11, 2008, the entire contents of which are incorporated herein by reference.

FIELD OF THE INVENTION

The invention relates to a locking mechanism for a vehicle seat, in particular for a motor vehicle seat, having a latch for locking to a counter element, which latch is pivotably mounted about a bearing pin, at least one securing element which secures the latch in the locked state, and at least one locking handle.

BACKGROUND OF THE INVENTION

Locking mechanisms of this type are known from use, in which a housing pivotably bears a metal latch, also denoted as a rotary catch, which cooperates with a metal counter element for locking, and a metal securing element which secures the latch in the locked state. The housing bears an unlocking handle in an integrally connected region which is articulated to the securing element by means of a connecting link.

SUMMARY OF THE INVENTION

The object of the invention is to improve a locking mechanism of the type described in the introduction.

According to the invention, a locking mechanism is provided for a vehicle seat. The locking mechanism comprises a latch for locking to a counter element, which is pivotably mounted about a first bearing pin. At least one securing element secures the latch in a locked state. A movable unlocking handle is articulated directly at one of the securing elements by means of a single point of articulation.

A direct connection of the unlocking handle to one of the securing elements present and thus a direct control of the securing elements by means of the unlocking handle makes intermediate elements, such as a coupling rod or lever kinematics unnecessary, and avoids additional fastening clips or plastic coverings, optionally also mirror-symmetrical parts.

In a preferred embodiment, which is also crash-safe, two securing elements are provided and namely one clamping element which is pretensioned and in the locked state acts on the latch, for example by acting on a functional surface of the latch by means of a clamping surface, and as a result exerting a closing moment on the latch, and a capture element which in the normal case is arranged at a short distance from the latch, in particular the functional surface thereof, and in the event of a crash, in particular by means of a capture surface, supports the latch, in particular on the functional surface thereof, and namely generally positively, so that possible opening of the clamping element counter to the pretensioning thereof has no effect.

The integration of a stop acting in a damping manner has the advantage that, when striking the counter element, the lock housing is specifically (resiliently) deformed, whereby the impact of the counter element is damped. Relative to locking mechanisms with specifically configured cushioning elements attached to the receiver, an integral configuration or at least a material connection of the integrated first stop to the lock housing has the advantage of a smaller number of components. The lock housing in the region of this first stop is configured to be flexible, for example by material recesses being provided.

After the counter element has resiliently deformed the lock housing to a specific degree due to the impact, it preferably strikes a second (metal) stop, for example on a lock cover, which is used to avoid too much deformation and damage to the lock housing by the impact of the counter element. The second stop is located in parallel, adjacent to the first stop, but displaced to the rear by said specific degree in the pivoted-in direction.

Due to its resilience in the contact region with the counter element, the lock housing is used at the same time to ensure that the counter element is free of backlash. In this manner, oblique positions, counter element tolerances and position tolerances of the counter element and of the locking mechanism may be compensated or absorbed.

A separation of the lock housing from the unlocking housing reduces the requirements for materials, in particular with regard to strength requirements in the region of the unlocking. Thus the material of the lock housing may be selected so that said lock housing has improved properties for implementing a stop and damping function. Additionally the geometry is simplified, which simplifies the tool design. The possibility of fastening a separate unlocking housing additionally makes it possible to use different customized variants of the unlocking, with an otherwise identical locking mechanism.

The locking mechanism according to the invention may be used at different points of a vehicle seat, for example for attaching the entire vehicle seat to the floor or as a backrest lock for fastening the backrest to the vehicle structure.

The invention is described in more detail hereinafter with reference to an exemplary embodiment shown in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a sectional view through the exemplary embodiment in the locked state with a counter element indicated;

FIG. 2 is a sectional view through the exemplary embodiment in the unlocked state;

FIG. 3 is a perspective view of the exemplary embodiment;

FIG. 4 is a partial view of the exemplary embodiment in the region of the lock housing;

FIG. 5 is a section view along the line V-V in FIG. 4;

FIG. 6 is a schematic view of a vehicle seat;

DESCRIPTION OF THE PREFERRED EMBODIMENTS

Figure 7:
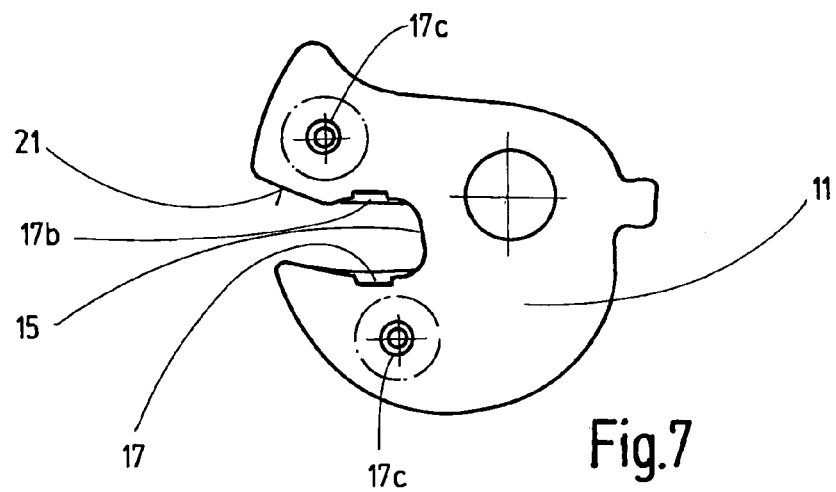
FIG. 7 is a side view of the latch with the cap.
Figure 8:
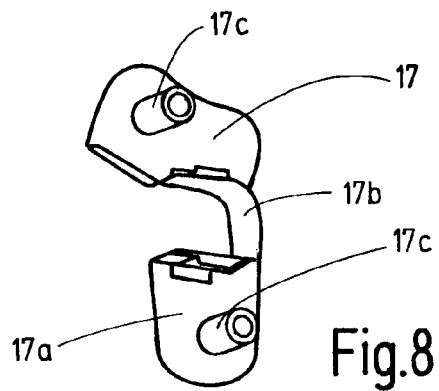
FIG. 8 is a perspective view showing an embodiment of the cap.
Figure 9:
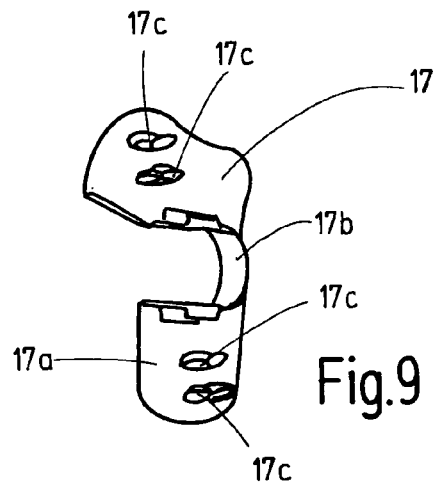
FIG. 9 is a perspective view showing an alternative embodiment of the cap.

Referring to the drawings in particular, a locking mechanism 1 is provided in a motor vehicle for attaching a backrest 2 of a vehicle seat 3 to the vehicle structure. The locking mechanism 1 has a half-open lock housing 5, with an approximately planar bottom surface and raised edges. The bottom surface is generally arranged in a plane defined by the direction of travel of the motor vehicle and by the vertical, which defines the directional information used hereinafter. The lock housing 5 is substantially closed by a lock cover 6 bearing against the lock housing 5 and approximately parallel to the bottom surface. The lock housing 5 is preferably formed from plastics, optionally with an insert part for increasing the strength, whilst the lock cover 6 is preferably a sheet metal part (steel or aluminum).

The lock housing 5 and the lock cover 6 form a receiver 7 which opens in the direction of a counter element B, in order to receive said counter element for locking. In this case, of the locking mechanism 1 and the counter element B, one is fastened to the structure of the backrest 2 and the other to the vehicle structure. The counter element B may, for example, be a bolt or a clip. The portion of the counter element B to be received by the receiver 7 generally extends horizontally. The direction in which the counter element B is received by the receiver 7 might be denoted as the pivoted-in direction. The dimension of the receiver 7 perpendicular to the pivoted-in direction (and in the plane of the bottom surface of the lock housing 5) is preferably greater than the corresponding diameter of the counter element B for compensating clearance.

The receiver 7 is designed on its base so that, in the pivoted-in direction, the region assigned to the lock cover 6 is set back relative to the region assigned to the lock housing 5. The region assigned to the lock housing 5 is configured as an integrated first stop 5a, against which the counter element B comes to bear when locked. The first stop 5a is configured to be resilient and acts in a damping manner. In the present case, the first stop 5a is formed in one piece with the lock housing 5—preferably consisting of plastics (with an optional insert part) (i.e. the stop 5a during production of the lock housing 5 is configured in one piece with the regions of the lock housing 5 adjacent to the first stop 5a, preferably by an injection-molding method). The region of the lock housing 5 located behind the first stop 5a in the pivoted-in direction has at least one (preferably a plurality of) material recess(es) 5b, which influence the resilient and damping properties of the first stop 5a. The lock housing 5 is, as a result, flexible in the region of the first stop 5a. A second stop 6a is formed on the region of the base of the receiver 7 assigned to the lock cover 6. Depending on the embodiment, the counter element B comes to bear against the second stop 6a during each locking process after deformation of the first stop 5a or only in the event of a crash or misuse.

A latch 11 is pivotably mounted on a first bearing pin 13, which in turn is fastened to the lock housing 5 (and to the lock cover 6) and protrudes perpendicularly from the bottom surface thereof, i.e. extends horizontally. In the present case, the first bearing pin 13, which is preferably metal, is riveted to the lock housing 5 and caulked to the lock cover 6. The first bearing pin 13 is preferably of hollow configuration, in order to receive a fastening means, for example a screw, by means of which the locking mechanism 1 is fastened during assembly to the associated structure. The latch 11 has a hook opening 15 for cooperating with the counter element B.

On the latch 11 which is preferably made of metal (or of a different hard material) sits a cap 17, preferably an injection-molded part made of plastics (or a part made of a different soft material). The cap 17 which is formed in one piece has a planar, flat region 17a which partially covers the side of the latch 11 (i.e. on one side) remote from the lock housing 5, an edge region 17b protruding therefrom (preferably in a perpendicular manner), which (at least partially) covers the edge of the hook opening 15 and at least one projection 17c for fastening to the latch 11. In the present case, the cap 17 has two projections 17c (or two pairs of projections 17c), which protrude parallel to the first bearing pin 13 from the flat region of the cap 17. Each projection 17c (or each pair of projections 17c) is inserted through a suitable opening in the latch 11 and (preferably positively) connected to the latch 11, for example clipped or preferably connected by ultrasonic-riveting, by means of a sonotrode. The cap 17 acts in a noise-damping manner when the counter element B is received by the hook opening 15 and comes to bear against the edge of the hook opening 15 (covered by the cap 17, i.e. covered by the edge region 17b thereof).

In the closed position of the latch 11, the hook opening 15 traverses the receiver 7 in an approximately perpendicular manner and is open to the side. The dimension of the hook opening 15 (together with the cap 17) aligned in the pivoted-in direction is slightly greater than the diameter of the counter element B, whereby the edge of the hook opening 15 located further to the inside in the pivoted-in direction, is set back relative to the stop 5a, so that the counter element B in the locked state of the locking mechanism 1 only bears against the stop 5a and not against said edge of the hook opening 15 located further to the inside in the pivoted-in direction. In the open position of the latch 11, the hook opening 15 is open obliquely relative to the pivoted-in direction and traverses the receiver 7 in an oblique manner. The latch 11 is preferably pretensioned in the direction of the open position.

The latch 11 has a functional surface 21 which in the locked position faces approximately in the direction of a second bearing pin 23, which is arranged parallel to the first bearing pin 13 and is fastened in the same manner to the lock housing 5 (and to the lock cover 6). If an insert part is provided in the lock housing 5, said insert part preferably holds the two bearing pins 13 and 23 at a defined distance from one another. The functional surface 21 is, for example, curved in the shape of a circular arc and of concave configuration but may also be planar. On the second bearing pin 23 a clamping element 25 is pivotably mounted, which is pretensioned toward the latch 11. In the locked state the clamping element 25 exerts a closing moment on the latch 11 as a securing element by means of a clamping surface 29 curved eccentrically to the second bearing pin 23, which is in non-self-locking contact with the functional surface 21. The clamping surface 29 is, for example, curved in the shape of a circular arc and of convex configuration.

A capture element 31 is arranged (relative to the second bearing pin 23) axially adjacent to the clamping element 25 on the side remote from the lock housing 5, and also pivotably mounted on the second bearing pin 23, i.e. aligned with the clamping element 25. The capture element 31 has a capture surface 33 which is located in the vicinity of the clamping surface 29, but in the locked state is spaced apart from the functional surface 21. The capture surface 33 is, for example, curved in the shape of a circular arc and of convex configuration, but may also be planar. The capture element 31 may be mounted in its center of gravity. The capture element 31 and the clamping element 25 are mechanically connected to one another with free travel, for example by means of a slot-pin guide or an axially protruding drive element. In the event of a crash, if the latch 11 were to be subjected to an opening moment and push the clamping element 25 slightly away, the capture surface 33 would come to bear against the functional surface 21, without an opening moment being able to be transmitted. Thus the capture element 31 serves for supporting the latch 11 and as a further securing element prevents an opening thereof.

The locking mechanism 1 further comprises an unlocking housing 40 which is configured separately and is fastened to the upper end of the lock housing 5 and the lock cover 6. In the present case, the unlocking housing 40 is pushed in the horizontal direction ("laterally") onto the lock housing 5 and clipped to the lock cover 6, the clipped connection between the lock housing 5 and the lock cover 6 being secured against a release of the connection by pushing on the unlocking housing 40. The unlocking housing 40 is substantially configured as a vertical duct, within which an unlocking handle 42 is arranged and is accessible—generally from above. The unlocking handle 42 is mounted in the unlocking housing 40, manually pivotable about an unlocking axis 43 parallel to the bearing pins 13 and 23. Resiliently coupled to the unlocking handle 42 is an indicator 45 which is guided in a longitudinally displaceable manner in the unlocking housing 40, and may partially extend from said unlocking housing in order to display the unlocked state of the locking mechanism 1. The resilient coupling of the indicator 45 has the purpose of avoiding damage to the extended indicator 45 in the event of misuse. The resilient coupling is implemented, for example, by means of a spring or a further resilient element, by means of which the unlocking handle 42 activates and extends the indicator 45. According to the type and geometry of the resilient element, for retracting the indicator 45, i.e. when the locked state of the locking mechanism 1 has to be displayed, temporary, positive contact may be provided between the indicator 45 and the unlocking handle 42. The indicator 45 is at least partially colored in a signal color which is preferably clearly differentiated from the color of the unlocking housing 40 or the covers thereof.

The unlocking handle 42 has at its lower end an actuating element 46. The actuating element 46 is in the present case configured as an integrally formed pin, which protrudes parallel to the unlocking axis 43 from the unlocking handle 42. The actuating element 46 acts in an articulated manner on the capture element 31 so that a direct point of articulation 48 between the unlocking handle 42 and the capture element 31 is formed. The point of articulation 48 is arranged offset (parallel) to the unlocking axis 43. In the present case, the point of articulation 48 is produced by the rounded actuating element 46 coming to rest in a radiused jaw-like receiver of the capture element 31. By the defined relative position of the second bearing pin 23 and the unlocking axis 43, the point of articulation 48 is maintained in all positions. However, optional securing is possible by the lips of the jaw-like receiver of the capture element 31 engaging behind the actuating element 46 after the resilient deformation thereof.

In the locked state of the locking mechanism 1, the counter element B is located in the receiver 7 and in the hook opening 15 of the closed latch 11, the clamping element 25 secures the latch 11, the capture element 31 is slightly spaced apart from the functional surface 21, the unlocking handle 42 is in its initial position and the indicator 45 is retracted. If the unlocking handle 42 is pivoted, the indicator 45 is extended, and by means of the point of articulation 48 the capture element 31 is also pivoted, i.e. the capture surface 33 moves away from the functional surface 21. The capture element 31 drives the clamping element 25, so that the latch 11 is no longer secured. Driven by one of the two securing elements or by individual pretensioning, the latch 11 opens. Due to the pivoting motion of the latch 11, the hook opening 15 is pulled back from the receiver 7 and releases the counter element B, which moves away relative to the locking mechanism 1 counter to the pivoted-in direction. Preferably, in the unlocked state of the locking mechanism 1 the latch 11 and the capture element 31 bear against one another for mutual support at a point which in each case is different from the functional surface 21 and the capture surface 33, so that the hook opening 15 remains in a ready-to-receive state.

If in this unlocked state the counter element B again enters the receiver 7 and comes to bear against the edge (covered by the cap 17) of the hook opening 15, the counter element B presses the latch 11 into its closed position. The clamping element 25 moves (due to its pretensioning) along the functional surface 21, as does the capture element 31 which is driven by the clamping element 25 or pivots due to its own pretensioning, whereby said two securing elements secure the latch 11 again. The pivoting capture element 31 pivots the unlocking handle 42 again into its initial position which at the same time retracts the indicator 45.

While specific embodiments of the invention have been described in detail to illustrate the application of the principles of the invention, it will be understood that the invention may be embodied otherwise without departing from such principles.

The invention claimed is:

1. A locking mechanism for a motor vehicle seat, the locking mechanism comprising: a counter element; a latch for locking to the counter element in a locked state, said latch being pivotably mounted about a first bearing pin; at least one securing element which secures the latch in the locked state, said at least one securing element being pivotably mounted about a second bearing pin; an unlocking housing comprising a vertical duct; a lock housing directly connected to said unlocking housing; and a movable unlocking handle arranged within said vertical duct, wherein said movable unlocking handle is accessible from a position above said vertical duct, said unlocking handle being manually pivotable and mounted about an unlocking axis parallel to said first bearing pin and said second bearing pin, said at least one securing element comprising a clamping element and a capture element, at least said latch and said capture element being arranged in said lock housing, said movable unlocking handle being articulated directly to said capture element by means of a single point of articulation displaced relative to the unlocking axis, wherein when the latch is in the locked state, the clamping element is pretensioned in a normal case to exert a closing moment on the latch, and in the event of a crash, the capture element supports the latch in the locked state, wherein said capture element and said clamping element are mechanically connected to one another with free travel via one of a slot-pin guide and an axially protruding drive element.

2. The locking mechanism as claimed in claim 1, wherein, the single point of articulation comprises a pin actuating element of the unlocking handle, and a jaw receiver of the at least one securing element, said pin actuating element engaging said jaw receiver, said capture element being mounted for movement such that said capture element is independently movable relative to said clamping element, said unlocking handle being a one-piece movable unlocking handle, wherein said pin actuating element of said one-piece movable unlocking handle is in direct contact with said jaw receiver of said capture element, said capture element and said unlocking handle defining said single point of articulation.

3. The locking mechanism as claimed in claim 1, wherein the clamping element and the capture element are pivotably mounted about the second bearing pin, which is arranged parallel to the first bearing pin for the latch, said capture element comprising a capture element surface, said latch comprising a functional surface, said capture element surface being located at a spaced location from said functional surface in the normal case, at least said functional surface engaging said capture element surface in the event of a crash, said clamping element comprising a clamping element surface, said clamping element surface engaging said functional surface in said normal case.

4. The locking mechanism as claimed in claim 1, wherein the latch, for cooperating with the clamping element and with the capture element, has a joint functional surface.

5. The locking mechanism as claimed in claim 1, wherein the point of articulation is provided directly at the capture element.

6. The locking mechanism as claimed in claim 1, further comprising an indicator resiliently connected to the unlocking handle.

7. The locking mechanism as claimed in claim 1, further comprising a cap on the latch, said cap covering at least partially an edge of a hook opening of the latch.

8. The locking mechanism as claimed in claim 7, wherein the latch is made of a latch material and the cap is made of a cap material, said cap material being softer than said latch material.

9. The locking mechanism as claimed in claim 1, wherein said lock housing bears the at least one securing element and said lock housing has an integrated stop for the counter element, which has a damping effect when the counter element comes to bear against the stop.

10. The locking mechanism as claimed in claim 9, wherein the counter element resiliently deforms the stop when the counter element comes to bear against the stop.

11. The locking mechanism as claimed in claim 10, further comprising a lock cover wherein the lock housing is configured to be half-open and is at least substantially closed by the lock cover.

12. The locking mechanism as claimed in claim 11, wherein the lock cover has a second stop against which the counter element comes to bear after deformation of the integrated stop.

13. A vehicle seat comprising: a backrest; and a locking mechanism, the locking mechanism comprising: a counter element; a latch for locking to the counter element in a locked state, said latch being pivotably mounted about a latch bearing pin; at least one securing element which secures the latch in the locked state, said at least one securing element being pivotably mounted about an at least one securing element bearing pin; and a movable one-piece unlocking handle pivotably mounted about an unlocking handle bearing pin parallel to said latch bearing pin and said at least one securing element bearing pin, wherein said at least one securing element comprises a clamping element that is pretensioned in a normal locked state of said locking mechanism to exert a closing moment on the latch, and a capture element that supports the latch in a crash state of said locking mechanism, the clamping element and the capture element both being pivotably mounted about the at least one securing element bearing pin, said latch having a common functional surface for engaging the clamping element and the capture element, at least a portion of said movable one-piece unlocking handle being directly connected to said capture element, wherein said portion of said movable one-piece unlocking handle and said capture element define a single point of articulation, said single point of articulation being located at a location spaced from said unlocking axis.

14. The vehicle seat as claimed in claim 13, wherein:
said portion of said one-piece movable handle comprises a pin actuating element, and said capture element comprises a jaw receiver, said pin actuating element being in direct contact with said jaw receiver, at least said pin actuating element defining said single point of articulation; and
the latch bearing pin, the unlocking handle bearing pin and said pin actuating element are parallel to one another.

15. The vehicle seat as claimed in claim 13, further comprising: an unlocking housing comprising a vertical duct, said movable one-piece unlocking handle being arranged in said vertical duct, said movable one-piece unlocking handle being accessible from a position above said vertical duct; a locking housing, at least said latch and said capture element being arranged in said locking housing, said locking housing engaging said unlocking housing.

16. The vehicle seat as claimed in claim 13, further comprising a cap on the latch, said cap covering at least partially an edge of a hook opening of the latch wherein the latch is made of metal and the cap is made of plastic.

17. The vehicle seat as claimed in claim 13, further comprising:
a lock housing which bears the latch and the at least one securing element and which has an integrated first stop for the counter element which has a damping effect when the counter element comes to bear against the first stop, wherein the counter element resiliently deforms the first stop when the counter element comes to bear against the first stop; and
a lock cover, wherein the lock housing is configured to be half-open and is at least substantially closed by the lock cover, wherein the lock cover has a second stop against which the counter element comes to bear after deformation of the first stop.

18. A locking mechanism for a motor vehicle seat, the locking mechanism comprising: a counter element; a latch for locking to the counter element in a locked state; at least one securing element which secures the latch in the locked state in a normal locked state of said locking mechanism and/or in a crash state of said locking mechanism; and a movable one-piece unlocking handle, said at least one securing element comprising a clamping element and a capture element, said clamping element being pretensioned in said normal locked state of said locking mechanism to exert a closing moment on the latch, said capture element supporting said latch in said crash state of said locking mechanism, at least a portion of said movable one-piece unlocking handle being in direct contact with said capture element so as to define a single point of articulation.

19. The locking mechanism as claimed in claim 18, further comprising: an unlocking housing comprising a vertical duct, said movable one-piece unlocking handle being arranged in said vertical duct, said movable one-piece unlocking handle being accessible from a position above said vertical duct; a locking housing, at least said latch and said capture element being arranged in said locking housing, said locking housing engaging said unlocking housing.

20. The unlocking mechanism as claimed in claim 19, wherein said unlocking housing is connected to said locking housing via a clip connection, at least a portion of said clip connection being formed on said unlocking housing and at least another portion of said clip connection being formed on said locking housing.

* * * * *